Jan. 27, 1925.
C. E. ROWLETT
1,524,577
SAW SET
Filed April 14, 1924
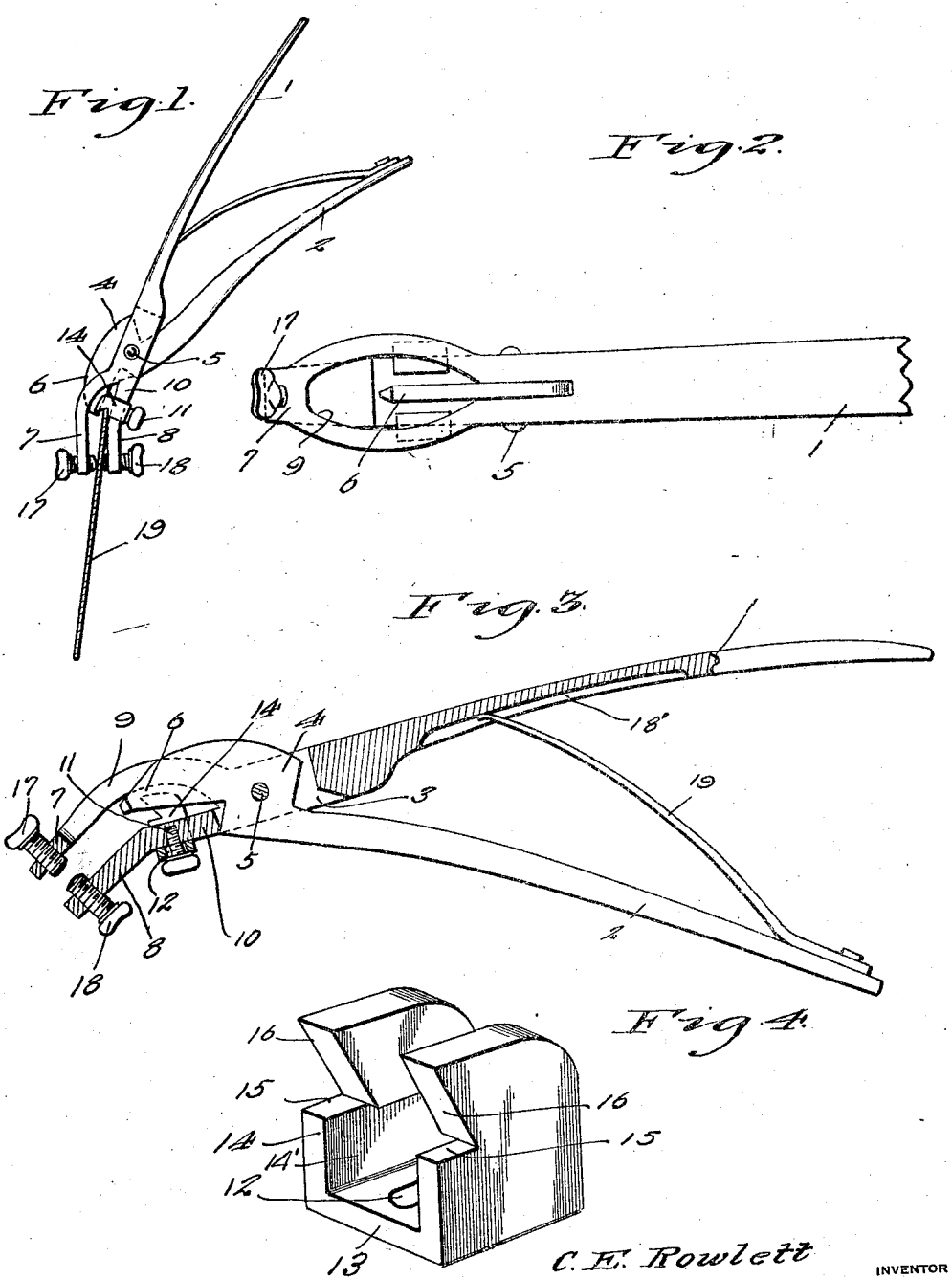
C. E. Rowlett
INVENTOR
BY Victor J. Evans
ATTORNEY Patented Jan. 27, 1925.

1,524,577

UNITED STATES PATENT OFFICE.

CHARLES E. ROWLETT, OF EWING, VIRGINIA.

SAW SET.

Application filed April 14, 1924. Serial No. 706,522.

*To all whom it may concern:*

Be it known that I, CHARLES E. ROWLETT, a citizen of the United States, residing at Ewing, in the county of Lee and State of Virginia, have invented new and useful Improvements in Saw Sets, of which the following is a specification.

The object of this invention is the provision of a saw set characterized by simplicity in construction and reliability and efficiency in practical use.

To the attainment of the foregoing, the invention consists in the improvement as hereinafter described and definitely claimed.

In the drawing:—

Figure 1 is a side elevation showing the improvement in position to act on the tooth of a saw.

Figure 2 is a top plan view of the improvement.

Figure 3 is an enlarged side elevation thereof, with parts in section.

Figure 4 is a perspective view of the gauge plate.

As disclosed by the drawing, my improvement contemplates the employment of two handle members 1 and 2 respectively. The handle 1 is provided with a slot 3 that receives the widened end 4 of the handle 2 therein, the said end being pivoted, as at 5, to the handle 1. The widened portion 4 of the handle 1 is extended to form the same with a tooth setting tongue 6. From its slotted portion 3 the handle 1 is bifurcated to provide the same with an upper jaw 7 and a lower jaw 8. Both of these jaws have their outer ends disposed at the same angle. The outer wall of the jaw 7 is widened and centrally provided with an opening 9 through which the upper edge of the setting tongue 6 is projected.

The straight inner end of the jaw 8, indicated for distinction by the numeral 10 is provided with a threaded opening entering from its outer face, and this opening has screwed therein a headed bolt 11. The bolt passes through an elongated slot 12 in the base 13 of the gauge plate. The base has its edges formed with upstanding sides 14, so that the gauge plate is really in the nature of a channeled member. The sides 14 have their outer edges notched to provide shoulders 15 and angle walls 16 extending from shoulders. The gauge plate, it will be noted, is adjustably associated with the jaw 8. The inner face of the sides of the gauge plate, from its base 13 to its shoulders 15 is channeled longitudinally, as at 14'. These channels are of a depth equalling the thickness of the straight portion 10 of the handle 2, and the width of the said straight portion 10 corresponds to the distance between the side walls provided by the channel. The straight portion 10 is received in the channeled portions of the sides which effectively holds the gauge plate from lateral movement thereon.

Threaded through the outer ends of the jaws 7 and 8 there are headed bolts 17 and 18 respectively. These bolts provide guide members for the saw blade 19, the teeth of the saw blade being received on the shoulders 10 of the gauge block, and the tooth between those resting on the said shoulders is designed to be contacted by the setting tongue 6 to set the said tooth, it being understood by those skilled in the art that the alternating teeth of a saw are bent at opposite angles.

Having one end secured to the handle 2 and its opposite end received in a longitudinal groove 18' in the handle 1 there is an arched spring 19. The spring holds the handles apart.

It is believed that the foregoing description, when taken in connection with the drawing, will fully set forth the construction, operation and advantages of the improvement to those skilled in the art to which such inventions relate.

Having described the invention, I claim:—

A saw set comprising two pivotally associated handles, one having a slot to receive the pivot end of the other therethrough, the end of the last mentioned handle terminating in an extension forming a tooth setting tongue, the slotted handle having its outer end bifurcated to provide upper and lower angle jaws, and the inner portion of the lower jaw being straight the upper jaw having its top formed with an opening for the passage of the setting tongue of the mentioned handle, a gauge block comprising a cross sectionally V-shaped member whose sides for a distance from its base are channeled for the reception of the mentioned straight inner portion of the lower jaw, means for sustaining the gauge block adjustable on the said lower jaw, said gauge block having upper shoulders and its outer edges inclined from the terminal of the shoulders, bolt members threaded through the jaws adjacent to the outer ends thereof, and spring means normally sustaining the handles in spread condition.

In testimony whereof I affix my signature.

CHARLES E. ROWLETT.